United States Patent
Hu

(10) Patent No.: US 7,171,219 B2
(45) Date of Patent: Jan. 30, 2007

(54) BACKWARD UPDATE STRATEGY FOR LOCATION MANAGEMENT

(75) Inventor: Chih-Lin Hu, Tainan (TW)

(73) Assignee: Benq Corporation, Taoyuan (TW)

( * ) Notice: Subject to any disclaimer, the term of this patent is extended or adjusted under 35 U.S.C. 154(b) by 274 days.

(21) Appl. No.: 10/989,068

(22) Filed: Nov. 15, 2004

(65) Prior Publication Data
US 2005/0261005 A1 Nov. 24, 2005

(51) Int. Cl.
*H04Q 7/20* (2006.01)

(52) U.S. Cl. ............... 455/456.5; 455/440; 455/433; 455/435.1

(58) Field of Classification Search .. 455/456.1–456.6, 455/414.2, 415, 440
See application file for complete search history.

(56) References Cited

U.S. PATENT DOCUMENTS

| 5,606,596 | A | * | 2/1997 | Jain et al. ............... 455/433 |
| 6,119,000 | A | * | 9/2000 | Stephenson et al. ...... 455/432.1 |

* cited by examiner

*Primary Examiner*—Lester G. Kincaid
*Assistant Examiner*—Sayed T. Zewari
(74) *Attorney, Agent, or Firm*—Thomas, Kayden, Horstemeyer & Risley

(57) ABSTRACT

A backward location update method for location management in wireless PCNs is provided. The VLR employs an intelligent micro procedure to determine different types of location update requests and performs a backward location update in the HLR only when required by call or short message delivery. Accordingly, the VLR avoids unnecessary location updates in the HLR.

10 Claims, 13 Drawing Sheets

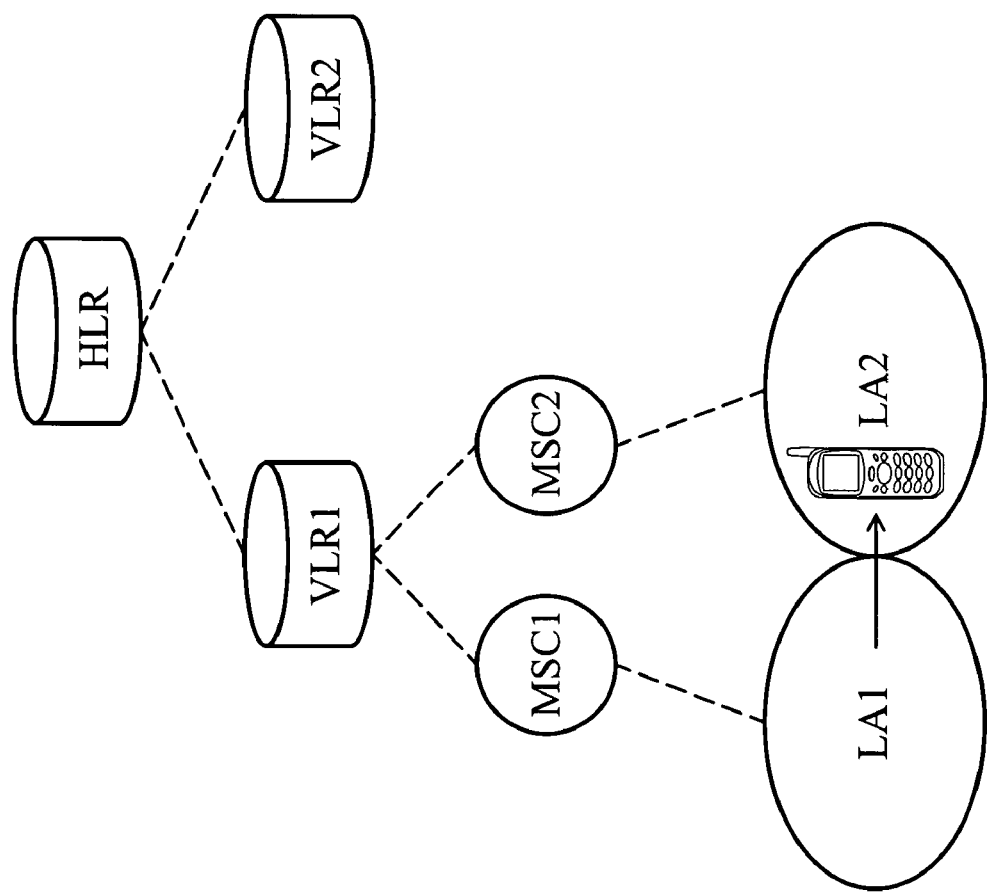

BACKWARD UPDATE STRATEGY FOR LOCATION MANAGEMENT

BACKGROUND

The invention relates to location management, and more specifically, to location management in personal communication services (PCS) for tracking the location of mobile subscribers between call arrivals.

IS-41 and GSM protocols are defined for PCS intersystem operations to support PCS network management. A separate, out-of-band common control signaling (CCS) provides supervisory, addressing, call information provisioning functions in the telephone network. The signaling system No. 7(SS7) network is a CCS systems developed to satisfy the signaling requirement for call control and mobility management between the public switched telephone network (PSTN) and personal communication network (PCN).

The location management in the PCNs tracks the location of the mobile station (MS). The IS-41 and GSM network deploy a two-tier system of mobility databases, Home Location Register (HLR) and Visitor Location Register (VLR), to store the location information of MSs. FIG. 1(a) depicts the location area hierarchy in GSM networks. A mobile service area is portioned into location/registration areas (LAs or RAs) 110. Every LA 110 substantially consists of a group of base transceiver stations (BTSs) 108 that communicate with the MSs over radio links. The geographic region served by a BTS 106 is also known as a cell in mobile communication systems. The BTSs 106 in an LA 110 are connected through a base station controller (BSC) 106 to a mobile switch center (MSC) 104. One or more MSCs 104 are connected to a VLR 102 which exchanges location information with the HLR 100.

FIG. 1(b) depicts the reference CCS network architecture with SS7 protocol. The signal messaging and exchanging among MSCs, VLRs, and HLRs are on top of the SS7 network which is in essence a two-level hierarchy corresponding to the location area hierarchy. The base stations within an RA 128 are connected via a wireline network to a service switching point (SSP) 126, i.e., an MSC, connected or collocated with a VLR. Different MSCs are connected to a local signal transfer point (LSTP) 124 via local A links 125, while all LSTPs in the same region are connected to a regional signal transfer point (RSTP) 122 via D links 123. The RSTP is also connected, via a remote A line 121, to a service control point (SCP) associated with an HLR.

The location management procedure in current PCNs involves location registration/update and terminal paging operations. When an MS moves from one LA to another, the MS performs the location registration/update to inform the network system. The network thus maintains the location information in the granularity of the location area. For call termination, however, the connection must be terminated at the cell where the target MS resides. To locate the MS, the terminal paging procedure pages all the cells in the LA. The described location management is based on an LA-based update and blanket paging strategy.

There exists a trade-off between the costs of location update and terminal paging operations. In general, location update operation includes transmitting signaling messages and information among network entities, and updating the records of the MS in the VLR and HLR. Although the network maintains the most recent location information whenever an MS makes a location movement, the LA-based update strategy consumes excessive network and database resources if the call rate to the MS is relatively low. In contrast, the terminal paging process must page a large coverage area, containing more cells, and thus the paging delay increases if the MS does not update its location frequently. Moreover, if the call rate to an MS is high, the cost of terminal paging is heavy. The LA-based update and blanket paging strategy is not cost-effective.

The location movement of an MS can be classified into three basic types: inter-LA, inter-MSC and inter-VLR movements. The inter-LA movement mainly makes the exchange of signaling messages within an LSTP region. Comparatively, the inter-MSC and inter-VLR movements have additional exchange of signaling messages among the target VLR, HLR and previous VLR in the RSTP region. In general, the cost of exchanging messages in the LSTP is lower than that in the RSTP.

SUMMARY

Accordingly, embodiments of a backward location update scheme reduce signaling traffic in RSTP regions by avoiding redundant location updates among the VLRs and HLR. In some embodiments, the backward location update method of a PCS network first detects changing LA of an MS, from a first LA to a second LA. The location update type of the MS is determined according to an update message received by a first VLR. The location update type comprises an inter-LA or inter-MSC movement, denoting that the first and second LAs are connected to the same MSC or different MSCs respectively. A record corresponding to the MS stored in the first VLR is updated according to addresses of the second LA and a current MSC. A flag in the record for the MS in the first VLR is set if the location update type is an inter-MSC movement. The first VLR does not notify an HLR of the change of the record if the flag is set. The set flag indicates that the first VLR must backward update the record for the MS in the HLR, when subsequently receiving a mobile station roaming number (MSRN) interrogation later on or when a record stored in the HLR is expired. The MSRN interrogation is initiated by a local exchange or gateway MSC (GMSC) when an incoming call is routed to the MS.

The location update type also comprises an inter-VLR movement, denoting that the first and second LAs belong to MSCs connected to different VLRs. When an inter-VLR location update is required, the second VLR dispatches an identification message to the first VLR, and the first VLR responds with the record for the MS to the second VLR. Accordingly, the second VLR creates a record for the MS and further forwards a location update message to the HLR. The HLR updates the record for the MS and instructs the first VLR to delete the record for the MS.

The procedure of checking the flag in the corresponding record is performed in the VLR to determine if the backward location update in response to an incoming call setup is necessary. The flag is set indicating that the record in the VLR is different than the corresponding record in the HLR.

An embodiment additionally considers the short message system (SMS) delivery by providing a complementary method for the retransmission of a failed short message attempt. The VLR perceives that the record in the HLR is expired when the corresponding flag is set, thus retransmission of the message will be initiated later. The VLR purposely generates an erroneous cause to indicate a short message transfer attempt failing. At the same time, the VLR backward updates the location information of the MS in the HLR in order to ensure that the MSC number used in the message retransmission is accurate.

BRIEF DESCRIPTION OF THE DRAWINGS

The invention can be more fully understood by reading the subsequent detailed description in conjunction with the examples and references made to the accompanying drawings, wherein:

FIGS. 2(a)~2(c) are schematic diagrams illustrating the inter-LA movement, inter-MSC movement, and inter-VLR movement respectively.

DETAILED DESCRIPTION

In the basic location management strategy, an MS must register or update its location when visiting a new LA. Both the VLR and HLR must keep the current mobile station roaming number (MSRN) of an MS in order to ensure that an incoming call or sent SMS is successful. This basic strategy, however, is not cost-effective when updating the VLR and HLR simultaneously. For instance, the MS can move through a number of LAs between two call arrivals, and only the routing information updated at the last location update is used for the call delivery, resulting in numerous unnecessary updates in the HLR and incurring excessive database overhead and signaling message traffic between the VLR and HLR.

Figure 1A:
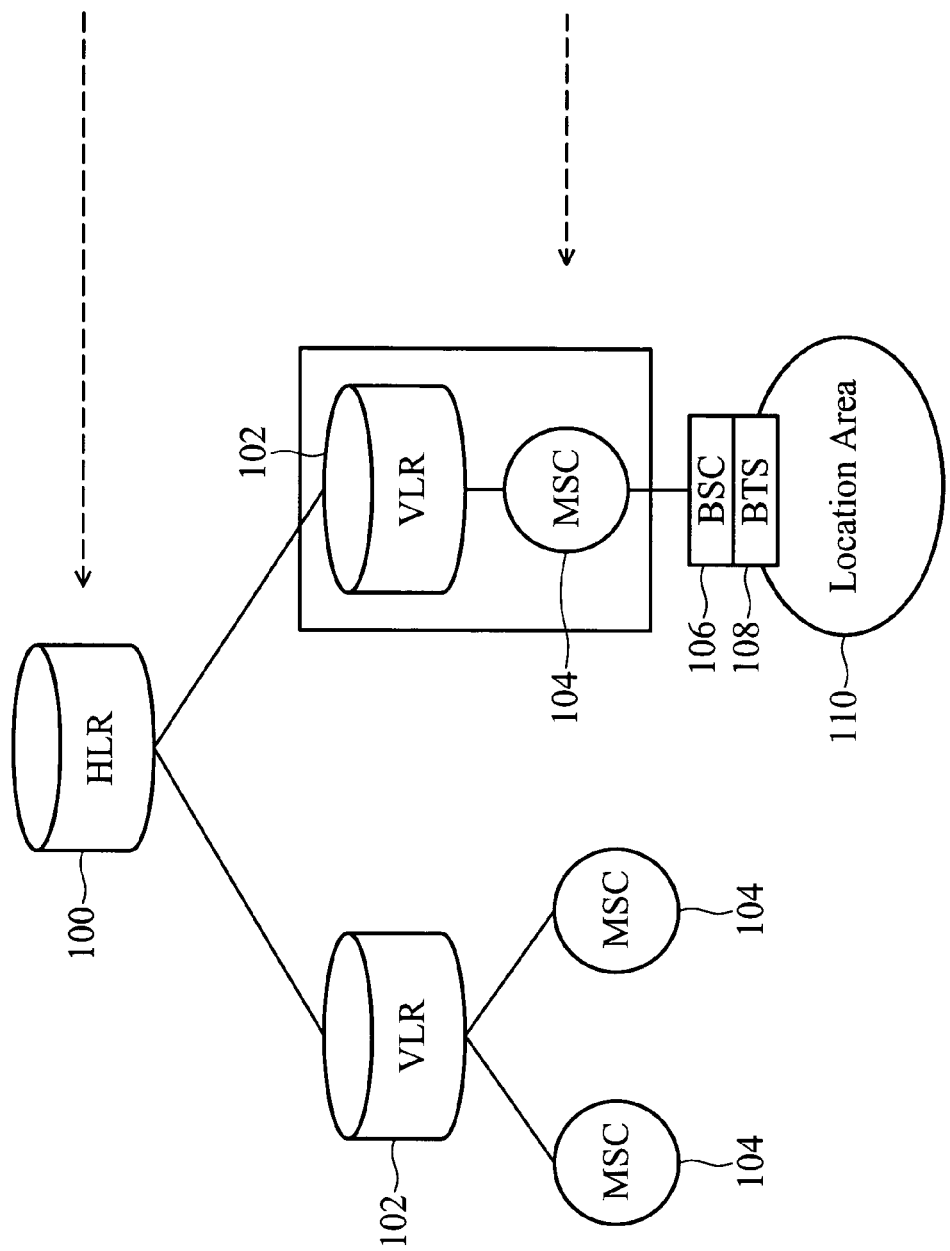
FIG. 1(a) is a schematic diagram illustrating the location area hierarchy in the personal communication networks (PCN) environment.
Figure 1B:
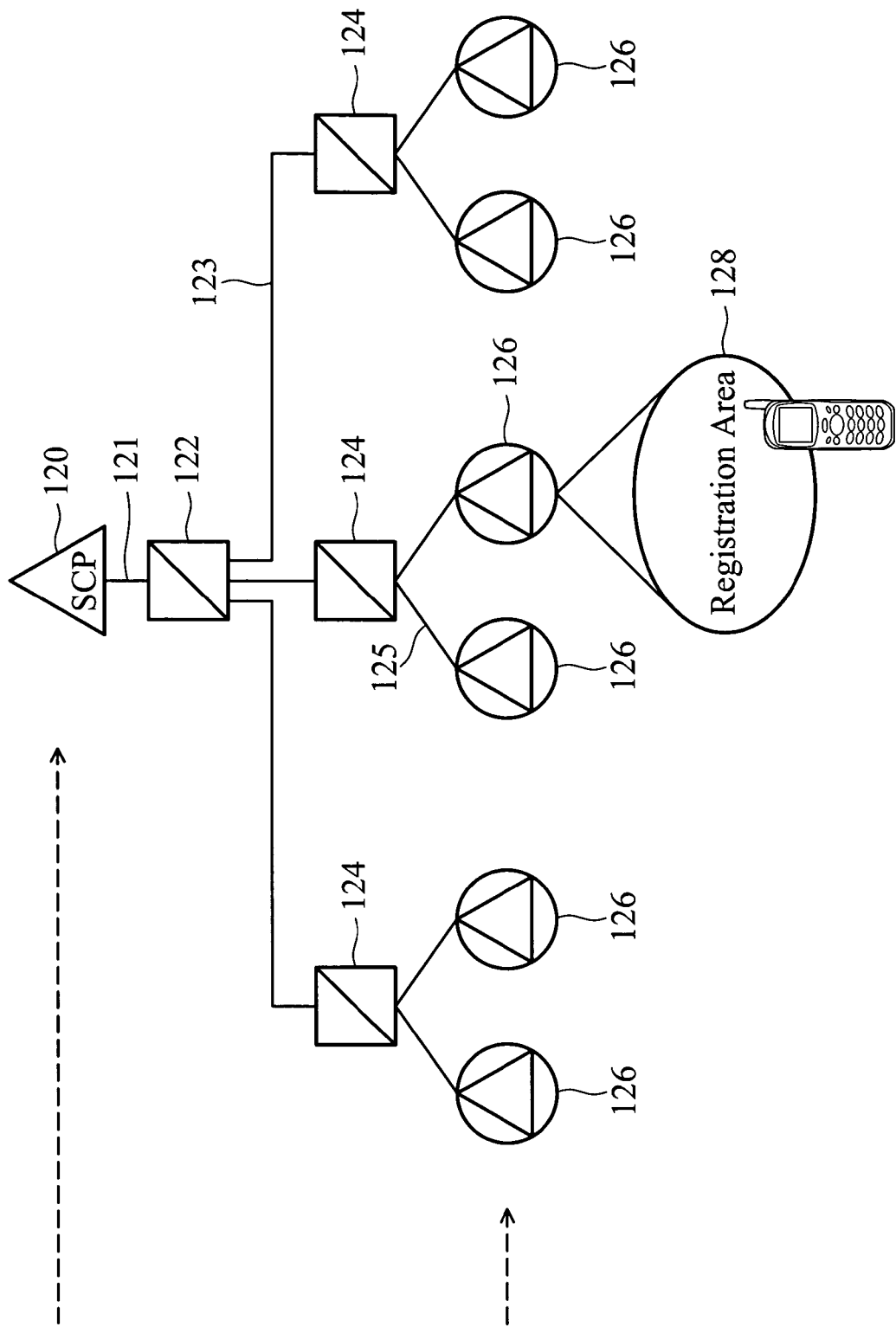
FIG. 1(b) is a schematic diagram illustrating the reference common control signaling (CCS) network architecture in the PCN environment.
Figure 2A:
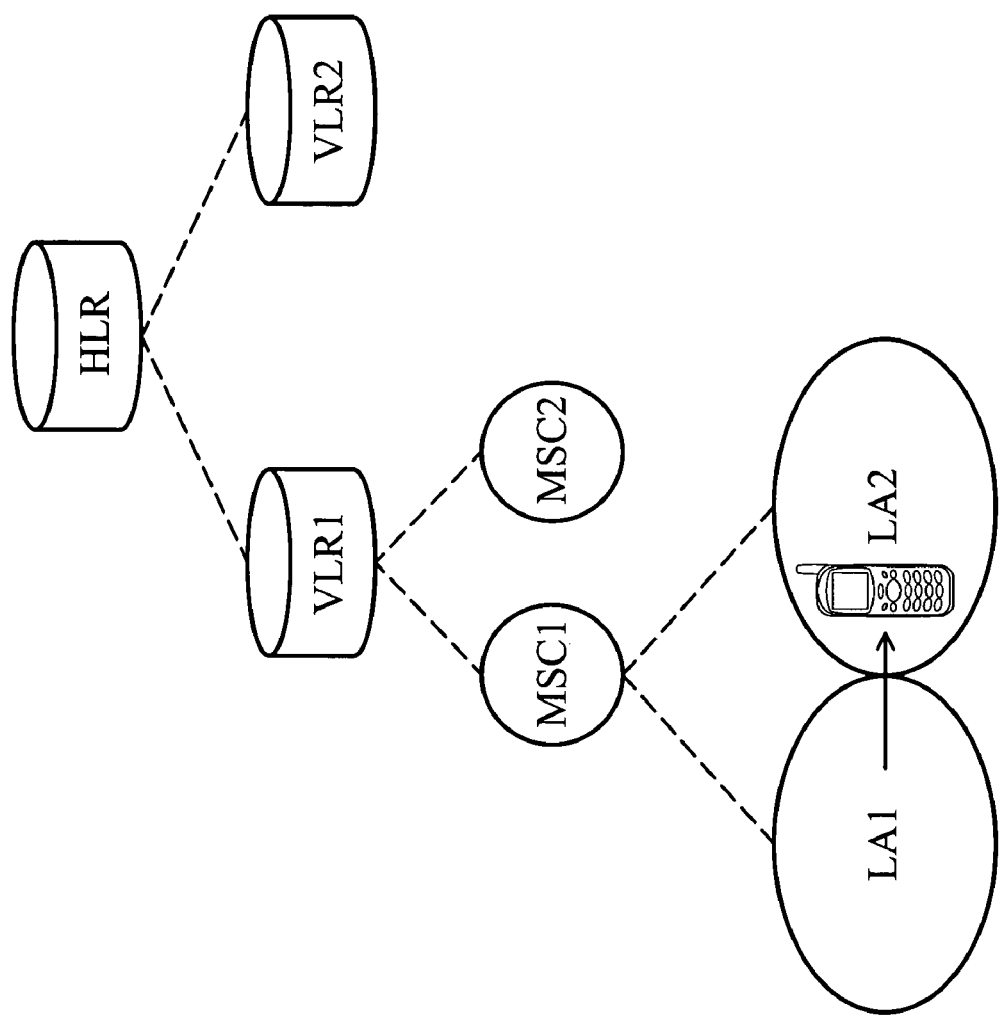
Figure 2C:
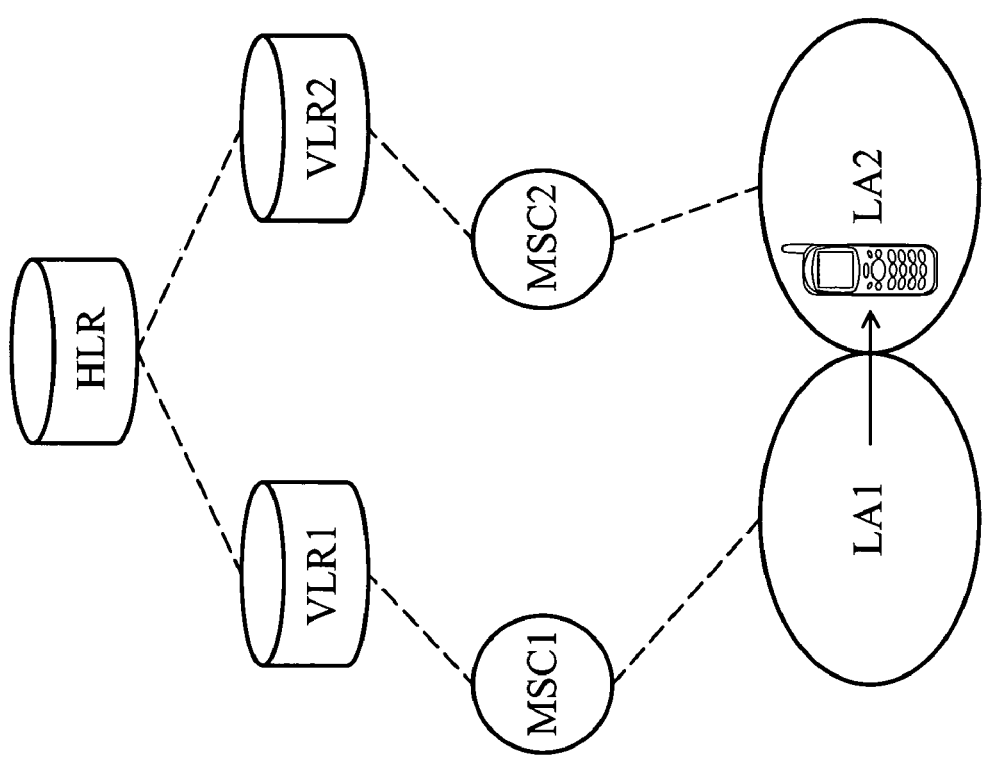

Embodiments of a backward location update scheme avoid redundant location update in the HLR. In the update-at-call (UAC) technique, the VLR always keeps the exact MSRN of an MS, whereas the MSRN of the MS in the HLR is updated as needed responding to a call arrival or an inter-VLR location movement. The VLR is capable of distinguishing the type of location movement from the received temporary mobile subscriber identity (TMSI) number sent from the MS. TMSI is an alias of international mobile subscriber identity (IMSI) assigned to an MS by the VLR. The VLR uses IMSI to identify the HLR of an MS, and the HLR uses IMSI to derive the record of an MS. Subsequently, the VLR updates the MSRN number of the MS in the case of an inter-LA/inter-MSC movement or creates a new record for the MS in the case of an inter-VLR movement. FIGS. 2(a)~2(c) are schematic diagrams illustrating the inter-LA movement, inter-MSC movement, and inter-VLR movement respectively. As shown in FIG. 2(a), the inter-LA movement denotes MS movement from LA1 to LA2, where both LAs are connected to MSC1. As shown in FIG. 2(b), the inter-MSC movement denotes MS movement from LA1 to LA2, where LA1 and LA2 belong to different MSCs in the same VLR region. For inter-VLR movement, as shown in FIG. 2(c), LA1 and LA2 belong to MSCs connected to different VLRs.

There are two ways of MSRN interrogation to determine the exact MSRN of an MS in order to route the call during call establishment. The MSRN is either stored in the HLR or obtained from the VLR. The HLR must update the MSRN of an MS corresponding to each location movement in the first way. In contrast, in the second case the exact MSRN is generated by the VLR instead of the HLR. The dated MSRN stored in the HLR is overridden by the new one simultaneously, while the interrogation is performed. In an embodiment of the invention, the UAC scheme is deployed at the VLR based on the system environment and the second MSRN interrogation is used.

In GSM systems, the VLR and HLR contain mobility databases to maintain location information and profiles of MSs. The record of an MS in the VLR includes the IMSI, TMSI, MSC address, location address identification (LAI), and etc. The corresponding one in the HLR includes the IMSI, VLR address, MSC address, and etc. The LA level is invisible to the HLR. For simplicity, as shown in FIG. 3, symbols such as Li, Mi, and Vi are used to denote the addresses of the LAi, MSCi, and VLRi, and in addition only partial fields of a record are expressed below.

Figure 3A:
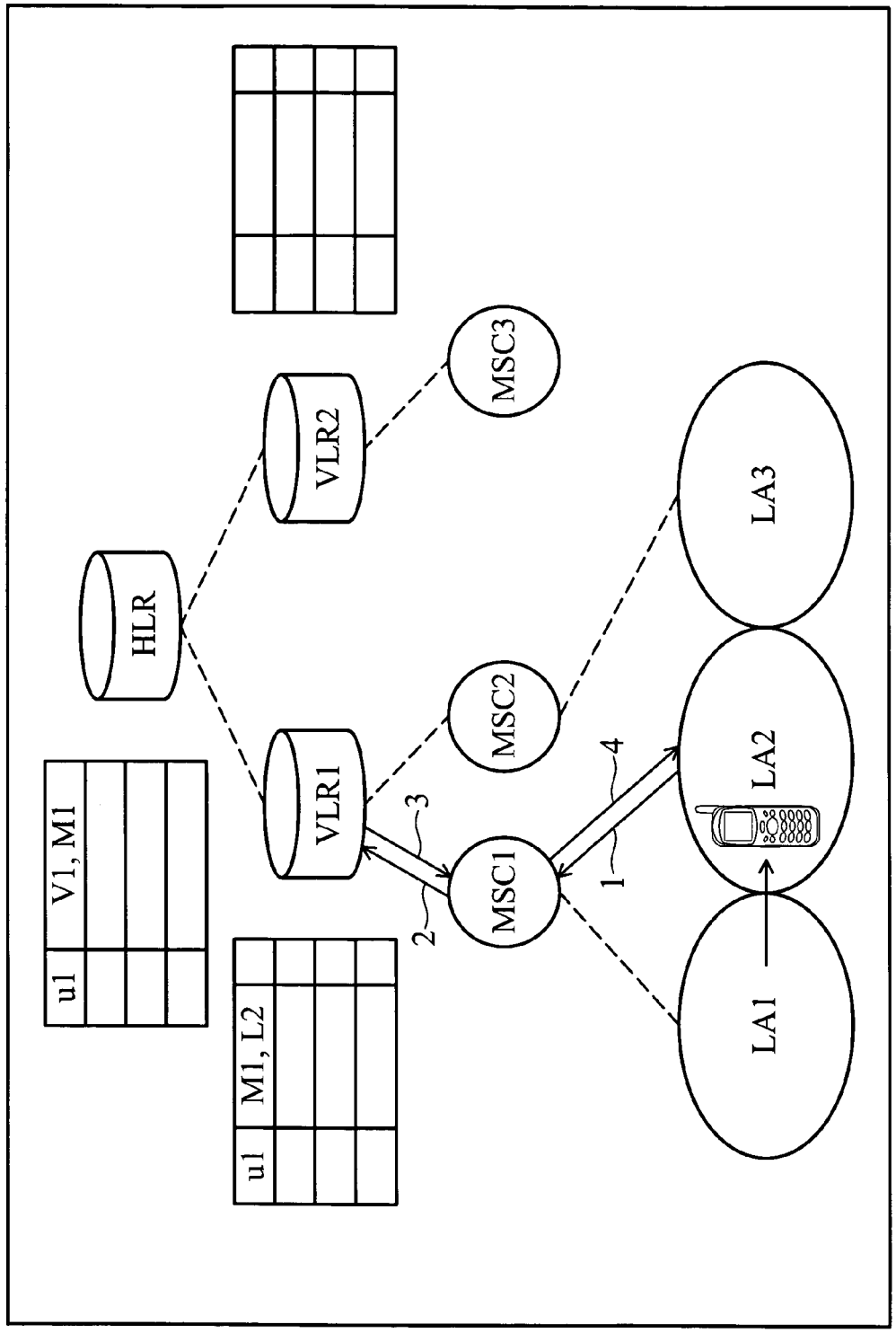
FIGS. 3(a)~3(c) illustrate the backward location update procedures corresponding to the inter-LA movement, inter-MSC movement, and inter-VLR movement according to an embodiment of the invention.
Figure 3B:
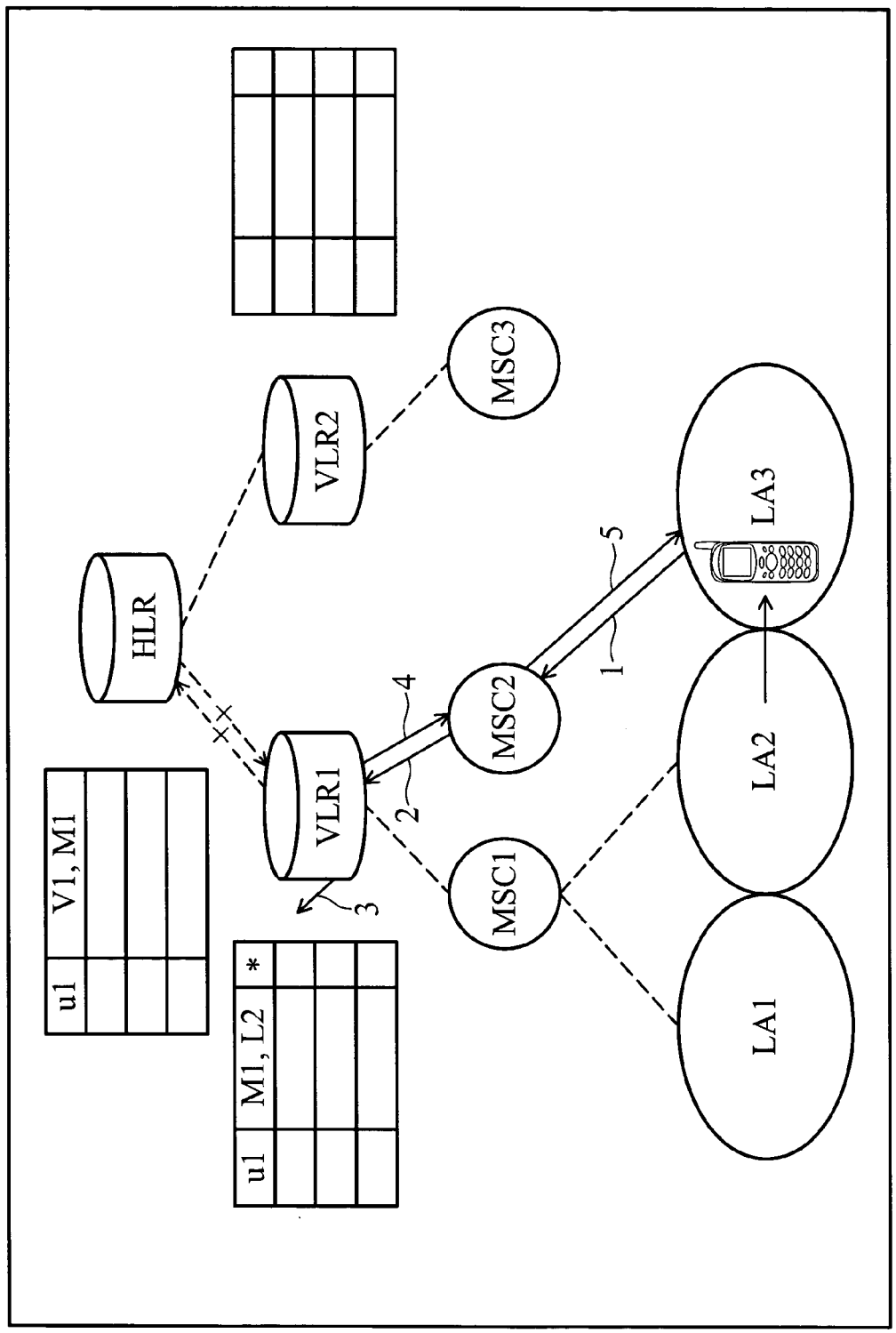
Figure 3C:
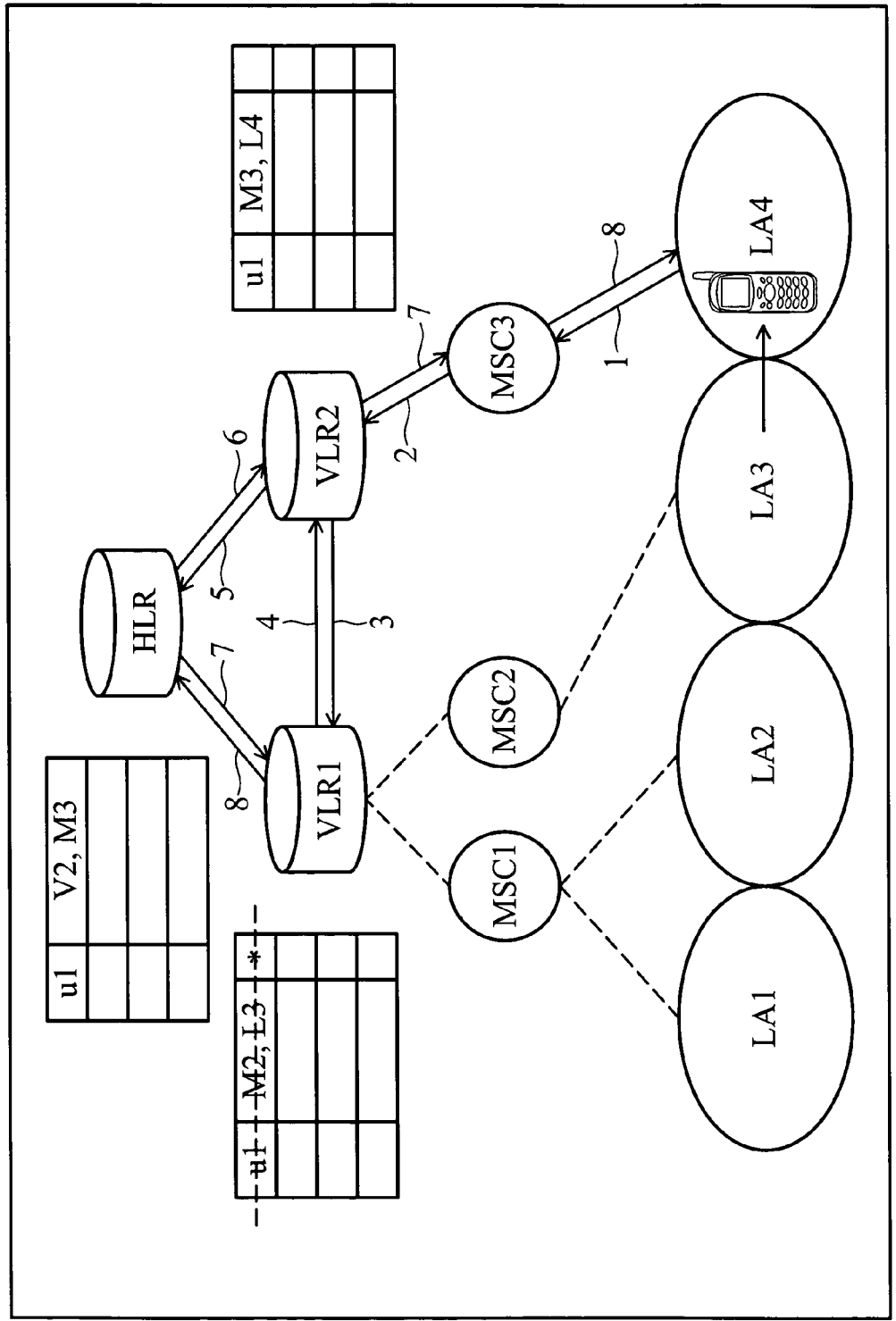

FIGS. 3(a)~3(c) illustrate the backward location update procedures corresponding to the inter-LA movement, inter-MSC movement, and inter-VLR movement respectively. It is assumed that an MS, u1, first moves in LA1 and has accomplished the location registration. The visited VLR1 has the record of u1 as <M1, L1, null>, and the HLR has the corresponding record <V1, M1 >. The record in the VLR has an extra flag field (1 bit) to indicate whether or not a backward update is currently necessary.

As shown in FIG. 3(a), an inter-LA location update is initiated as u1 moves from LA1 to LA2. VLR1 receives an update message from u1, forwarded through MSC1, including TMSI1, L1, L2, M1, V1 and etc. VLR1 notices that the address of the previous MSC is the same as that of the target MSC. VLR1 thus knows the occurrence of an inter-LA movement and updates the LA field of record as <M1, L2, null>. VLR1 does not update the corresponding record in the HLR since the routable location information, i.e., MSRN, is unchanged.

As depicted in FIG. 3(b), u1 sends an update message forwarded by MSC2 to VLR1 when moving from LA2 to LA3. VLR1 receives the update message including TMSI1, L2, L3, M1, M2, V1 and others. VLR1 determines that u1 has an inter-MSC movement as L2 and L3 belong to different MSCs. VLR thus updates record u1 as <M2, L3, *>. VLR1, however, does not immediately notify the HLR of the change of record u1. The marked flag '*' in record u1 indicates that the VLR must backward update record u1 in the HLR, while receiving an MSRN interrogation as there is an incoming call or message destined for u1. Record u1 in the HLR remains as <V1, M1> even though it is not up to date. In some embodiments, record u1 stored in the HLR is updated periodically, thus the VLR backward updates record u1 when the record is expired.

FIG. 3(c) depicts the inter-VLR location registration. As u1 moves from LA3 to LA4, it sends a location update message to the visited VLR2. The update message includes TMSI1, L3, L4, M2, M3, V1 and etc. Since VLR2 does not yet have record u1, an identification message including the TMSI1 of u1 is dispatched to VLR1. VLR1 responds record u1, including IMSI and a partial profile, to VLR2. Accordingly, VLR2 creates a record for u1 as <M3, L4, null> and further forwards a location update message to the HLR. The HLR updates record u1 as <V2, M3> in that V1 is invalid after VLR1 delete record u1. Note that the flag field of u1 in VLR2 is marked "null" for current record.

When an MS resides in an LA which is the same as the one updated at the last call arrival, the VLR can update the record of the MS as usual. In contrast, updating the corresponding record in the HLR may be critical somehow because the routable information is the same. In an embodiment of the invention, a loop of a location movement can be resolved when the VLR has logged the LAI where the last call occurred, and each record of an MS in the VLR has an extra field to do so. Moreover, a comparison routine is added in the location update procedure, for example, as the VLR discovers that an MS has a loop of location movement, the marked flag '*' is reset to be null. Thus, no backward update will be performed during the MSRN interrogation for this incoming call.

Figure 4:
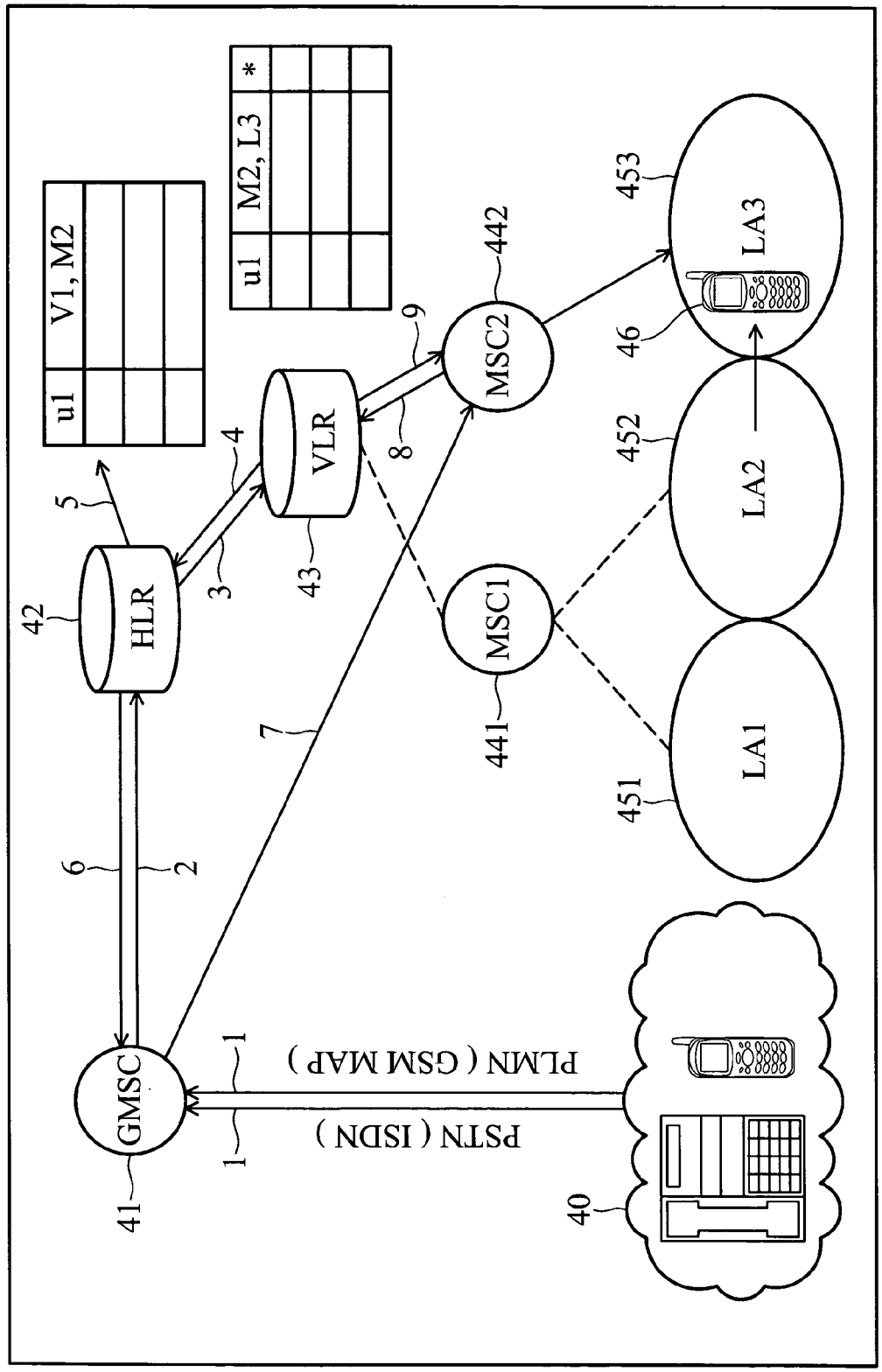
FIG. 4 illustrates the call delivery message flow associated with the backward location update scheme according to an embodiment of the invention.

FIG. 4 illustrates the call delivery message flow associated together with the backward location update scheme according to an embodiment of the invention. The call connection establishment comprises three phases sequentially: an outgoing call setup, routing interrogation for an incoming call, and an incoming call setup.

When a public switched telephone network (PSTN) or public land mobile network (PLMN) user 40 dials an MS's number (step 1), the call is routed to the local exchange or gateway MSC (GMSC) 41 which is capable of interrogating the HLR 42 for the MSRN of the target MS 46. If the caller 40 is a PLMN user, this process includes the setup indication, authentication, ciphering on the air, and sending information for outgoing calls among the MS, MSC, and VLR. The connection request of the outgoing call setup is signaled to the GMSC 41 through SS7 ISUP IAM. Then, the call delivery is interrupted temporarily in the GMSC 41.

The GMSC 41 interrogates the HLR 42 to obtain the exact MSRN of the target MS 46 (step 2). The HLR 42 forwards the "providing MSRN message" including the MS's IMSI to the target VLR 43 (step 3). The VLR 43 retrieves the MS record and then responds with the MSRN back to the HLR 42 (step 4). Moreover, the VLR 43 checks the flag field in the MS record. If the state is marked '*', the VLR 43 knows that the location information of the MS stored in the HLR has not been updated. The VLR then sends a backward location update message to the HLR (step 4). The HLR updates the MS record (step 5) so that the records in the VLR and HLR can be consistent. The MS record in the HLR is current if the state of the flag field is null.

Figure 5:
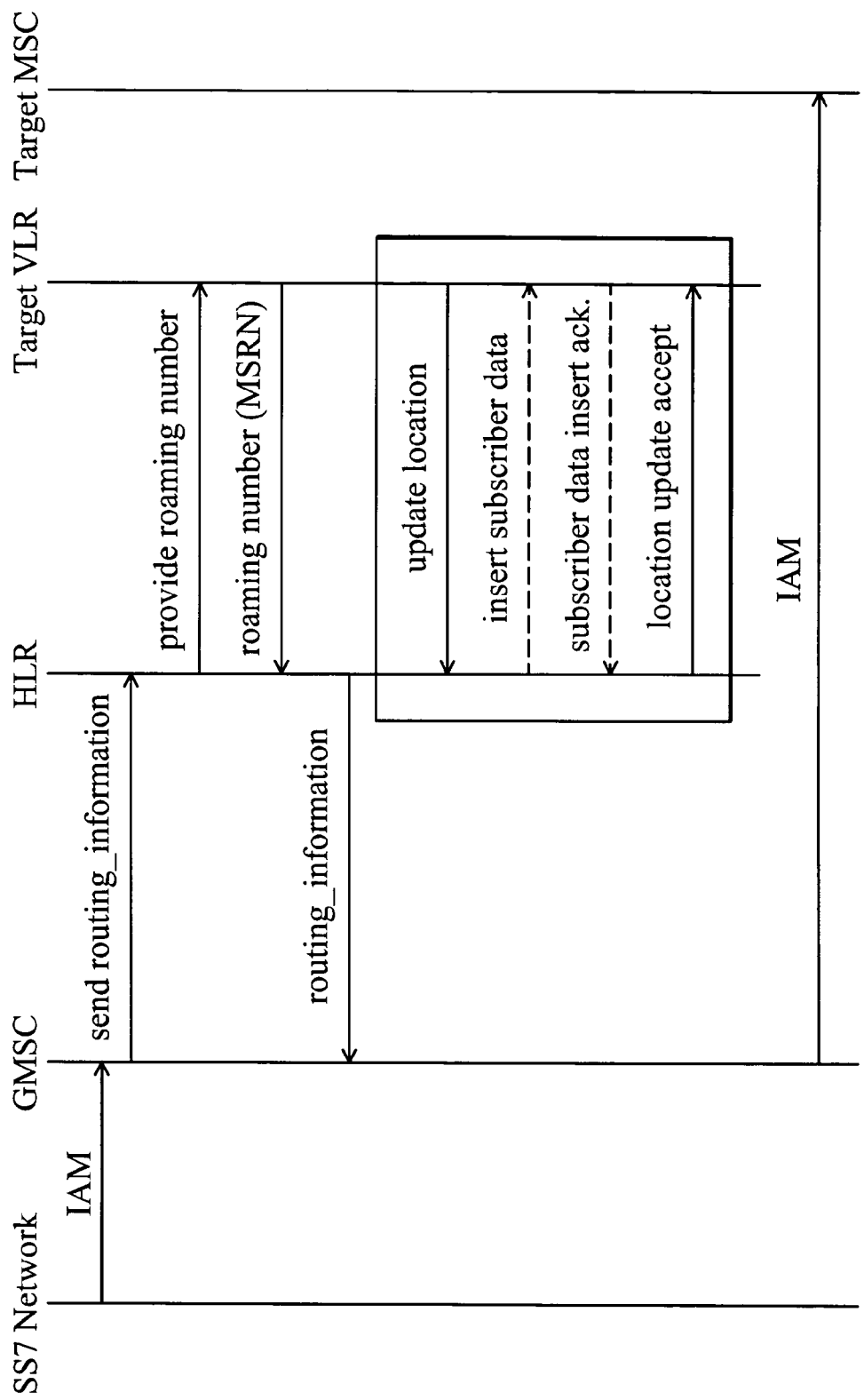
FIG. 5 illustrates the interrogation of routing information in the backward location update method according to an embodiment of the invention.

FIG. 5 illustrates the routing interrogation in the backward location update method according to an embodiment of the invention. The VLR can obtain additional information about the subscriber from the HLR during execution of the backward location update, such as configuration parameters for supplementary services. The "insert subscriber data" procedure is defined for the HLR to transmit the current data of the subscriber profile to the VLR. Note that, it is not imperative to perform this procedure during the backward location update. In practice, the profile-parameter changes are always informed immediately to the VLR.

As shown in FIG. 4, the GMSC 41 routes the call to the target MSC 442 (step 7) when receiving MSRN from the HLR 42 (step 6). The call processing is interrupted temporarily in the MSC 442 before the exact LA 453 of the target MS 46 is determined. To interrupt the call process, the MSC 442 first forwards the VLR 43 a message to initiate a terminal paging (step 8). The VLR 43 broadcasts the paging messages, through the MSC 442 and BSS, in all cells of the LA 453 (step 9). The called MS 46 responds directly to the MSC 442 when receiving a paging call. Subsequently, the call processing is continued to accomplish the call setup.

In an embodiment of the invention, the backward location update procedure also considers the influence of the short message system (SMS) delivery. The SMS is transported in a store-and-forward manner based on a connectionless relay protocol. Since the backward location update scheme is employed, it is possible that a dated MSRN may be used by the SMS-GMSC to route the short message transfer. With a dated MSRN, the transport of a short message will fail. The MSC sends a failed report to the SMS-GMSC that forwards the failure report to the HLR. The HLR stores the failure report. The HLR will invoke an "Alert_SC Service" to initiate another delivery attempt as the MS is again recognized.

The retransmission of a short message can only be successful if the HLR has updated the routing information of the target MS. To satisfy this requirement, a complementary procedure based on the SMS protocol and signaling is provided in an embodiment of the invention, to maintain the SMS delivery.

Figure 6:
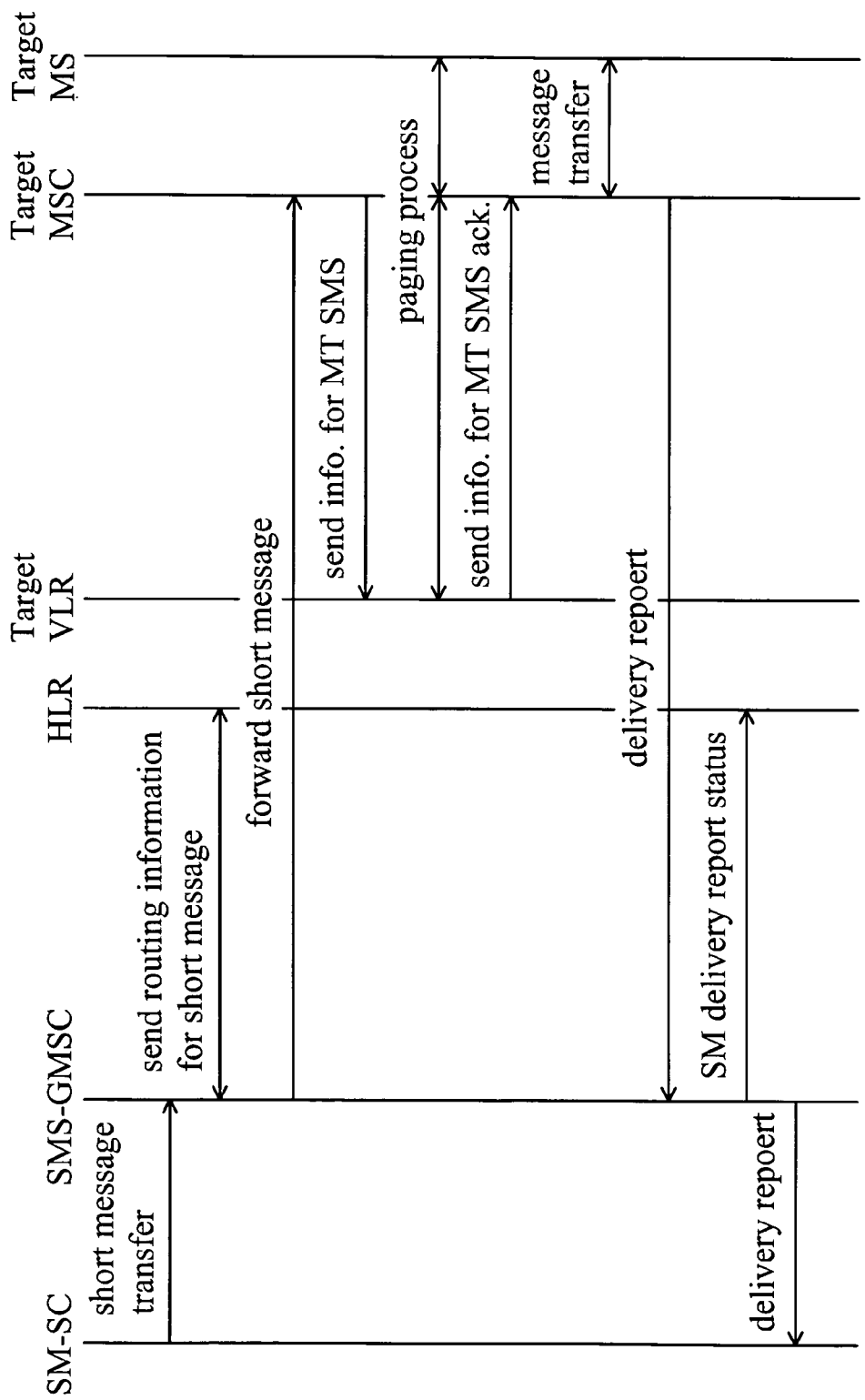
FIG. 6 illustrates the mobile terminated short messaging procedure.

By using the MSC number interrogated from the HLR, the SMS-GMSC forwards a short message to the target MSC. The MSC sends a "send info for MT SMS" message to the VLR. The VLR checks the value of the flag field in the record of the target MS when this message is received. In the case of 'null' in the flag field, the VLR continues the mobile terminated short messaging procedure as shown in FIG. 6. FIG. 6 illustrates the mobile terminated short messaging procedure when the record corresponding to the target MS in the HLR is current. The VLR perceives that the MSC number included in this message is expired if the flag is marked '*', which indicates that delivery is about to fail. A failure report is then sent back to the SMS-GMSC and the HLR, and a retransmission of the message will be initiated later. To achieve retransmission, the VLR purposely generates an erroneous cause to indicate a short message transfer attempt failure. At the same time, the VLR backward updates the record corresponding to the target MS in the HLR. Hence, the MSC number used in the message retransmission will be accurate.

Figure 7A:
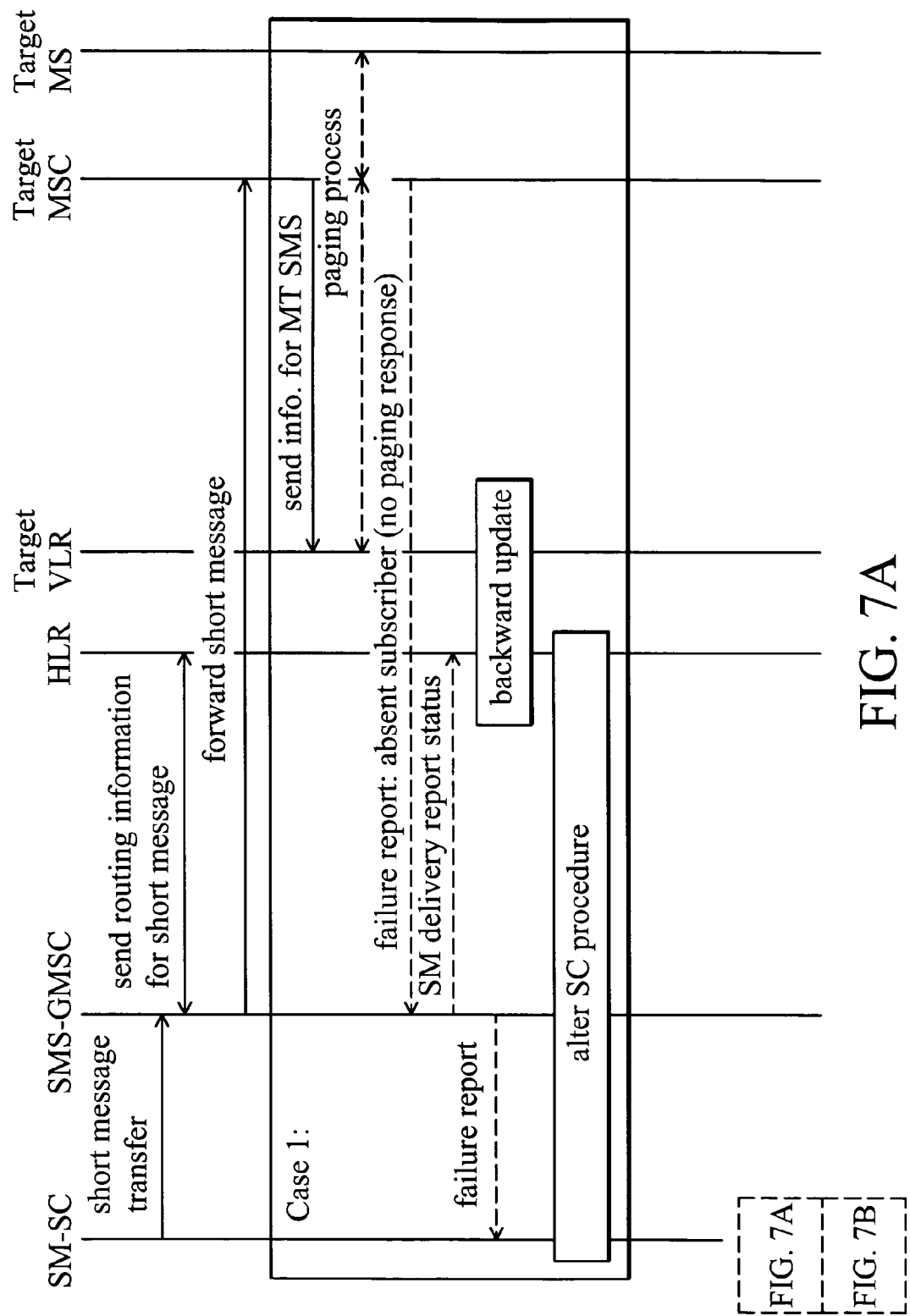
FIGS. 7A~7B show the three respective retransmission flows associated with the backward location update scheme in an embodiment of the invention.
Figure 7B:
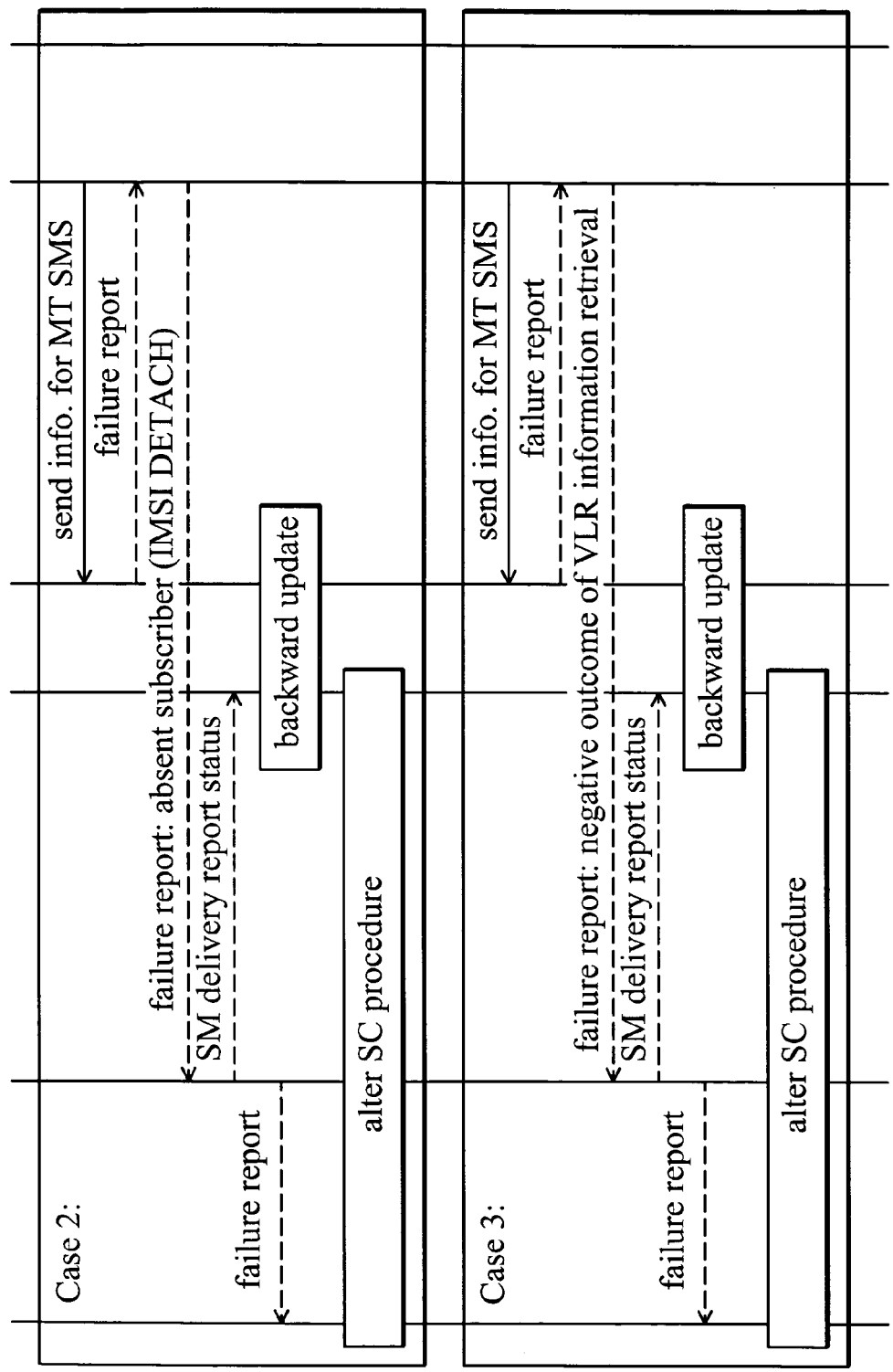

The VLR selects one of three erroneous causes for short message transfer attempt failure. The three causes are, absent subscriber due to no page response, absent subscriber due to IMSI DETACH in the VLR, for example, the subscriber turns off the phone, and negative outcome of VLR information retrieval, for example, due to a VLR database error. FIGS. 7A~7B show the three respective retransmission flows associated with the backward location update scheme in an embodiment of the invention. Note that the design of the complementary procedure complies with the SMS protocol and therefore maintains the SMS delivery.

In some embodiments, retransmission methods require further scrutiny. For example, the VLR can postpone the page procedure purposely, causing a timer in the MSC to expire. The MSC will send a failure report to the SMS-GMSC. Additionally, the VLR can redirect the short message transmission to the accurate MSC if the SMS protocol is intelligent, thus the backward update scheme may not achieve message retransmission. The SMS traffic can also be minimized.

The provided backward location update scheme for location management in PCNs has the following special features. First, it is based on the standard message signaling protocol and location area hierarchy for the current IS-41 and GSM. Second, it has high cost-effectiveness and is insensitive to mobility and call patterns because the backward update is performed on demand. The signaling traffic between VLRs and the HLR for location update is greatly reduced by employing the backward location update method. The signaling cost between VLRs and HLR is significant as compared with lower layers of the location area hierarchy. Third, no MS or network entity modifications are required, except for the VLRs which employ an intelligent micro procedure. Finally, the backward location update scheme is able to maintain the call delivery and the short message transfer in compliance with the protocol standards.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backward location update method for location management in a personal communication service (PCS) network, comprising:

detecting movement of a mobile station (MS) in the PCS network from a first location area (LA) to a second LA;

determining a location update type of the MS according to an update message received by a first visitor location register (VLR), wherein the location update type comprises an inter-LA or inter-MSC movement denoting the first and second LAs are connected to the same mobile switch center (MSC) or different MSCs respectively;

updating a record stored in the first VLR corresponding to the MS, wherein the record is updated according to addresses of the second LA and a current MSC and a flag in the record is set if the location update type is an inter-MSC movement; and preventing instantaneous notification to a home location register (HLR) of the change of the record until a mobile station roaming number (MSRN) interrogation corresponding to the MS is received by the first VLR or when a record stored in the HLR is expired.

2. The backward location update method according to claim 1, further comprising:

receiving the MSRN interrogation corresponding to the MS by the first VLR;

checking if the flag in the record stored in the first VLR is set; and backward updating a record stored in the HLR corresponding to the MS by sending a backward location update message from the first VLR to the HLR if the flag is set.

3. The backward location update method according to claim 2, further comprising resetting the flag after updating the record stored in the HLR.

4. The backward location update method according to claim 2, wherein the backward location update message comprises international mobile subscriber identity (IMSI) of the MS, addresses of the current MSC, and the first VLR.

5. The backward location update method according to claim 1, wherein the location update type further comprises an inter-VLR movement denoting that the first and second LAs belong to MSCs connected to different VLRs, and the second LAs corresponding to a second VLR.

6. The backward location update method according to claim 5, while the location update type is an inter-VLR movement, the method further comprises:

dispatching an identification message from the second VLR to the first VLR;

responding with the record stored in the first VLR corresponding to the MS to the second VLR;

creating a record stored in the second VLR for the MS;

forwarding a location update message to the HLR;

updating the record stored in the HLR corresponding to the MS upon receiving the location update message; and instructing the first VLR to delete the record stored in the first VLR corresponding to the MS.

7. The backward location update method according to claim 1, further comprising:

forwarding a short message from a short message system gateway MSC (SMS-GMSC) to the MSC by using an MSC number derived from interrogation of the HLR;

sending a request message from the MSC to the first VLR;

checking the flag in the record stored in the first VLR corresponding to the MS upon receiving the request message;

updating the location information of the MS in the HLR if the flag is set; and initiating a retransmission of the message after updating the HLR.

8. The backward location update method according to claim 7, further comprising sending a failure report to the SMS-GMSC and the HLR while the VLR updating the location information of the MS in the HLR, wherein the failure report comprises an erroneous case generated by the VLR to indicate a short message transfer attempt failing.

9. The backward location update method according to claim 1, wherein the flag in the record stored in the first VLR comprises one bit.

10. The backward location update method according to claim 1, wherein the MSRN interrogation is initiated by a local exchange or a gateway mobile switch center (GMSC) interrogating the HLR for routing information of the MS.

* * * * *